Patented Mar. 27, 1928.

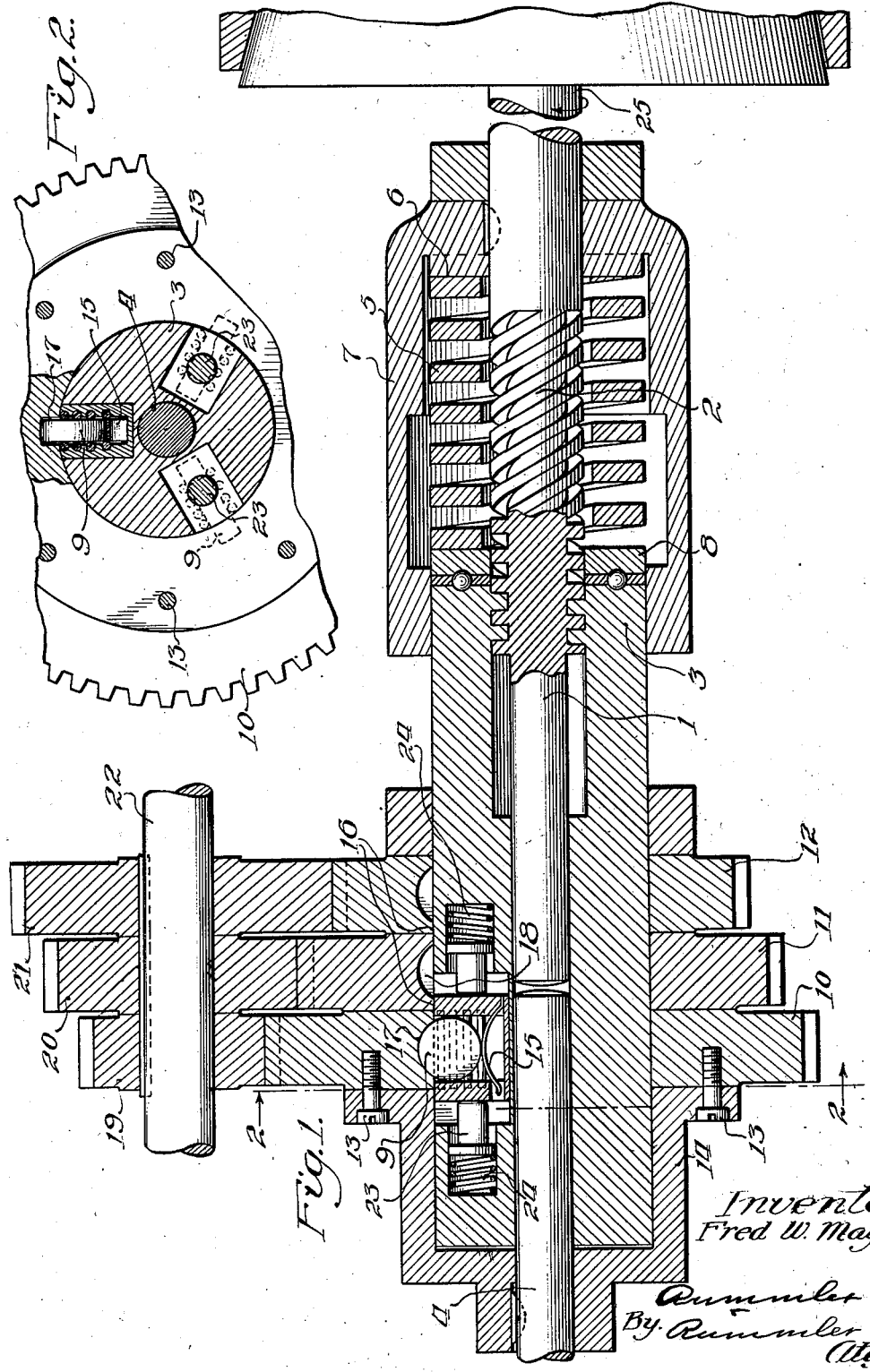

1,664,303

UNITED STATES PATENT OFFICE.

FRED W. MAYER, OF CHICAGO, ILLINOIS.

GEAR-RATIO-CHANGING MECHANISM.

Application filed January 21, 1927. Serial No. 162,466.

This invention relates to means for automatically changing the ratio between a driving shaft and a driven shaft in approximate proportion to changes in load on the driven shaft.

The object of the invention is to provide a simple and reliable mechanical means for automatically changing the ratio between the two shafts without the necessity of shifting gears either mechanically or manually and to provide a construction which does not require the attention of an operator for insuring approximately the correct geared relationship between a driving and driven shaft according to fluctuations in the load or rate of delivery of the applied power.

These objects of the invention are accomplished by a construction, the principle of which is diagrammatically illustrated in the accompanying drawing, in which:

Figure 1 is a longitudinal sectional view of the improved mechanism.

Fig. 2 is a sectional detail taken on the line 2—2 of Fig. 1.

The improved construction is a mechanism employing two sets of gears in fixed relationship, one set being coaxial with the driving and driven shafts and the other set being supported on a counter-shaft parallel with the driving and driven shafts. An automatic clutch means is provided for connecting and disconnecting different pairs of gears for the purpose of changing the ratio between the driving and driven shafts. This clutch mechanism is shifted according to the load by a coil spring which is tensioned differentially, as required for producing the necessary shift, by a worm and a nut connection with one of the shafts. The resistance to tensioning offered by the spring determines the ratio. If the resistance is light, the high speed relationship will exist. If the resistance is great the spring is compressed by the action of the worm, and the clutch controlled by a nut engaging the worm is shifted to increase the ratio between the shafts.

This construction above generally indicated is illustrated in the drawings as follows:

The driving shaft is shown provided with a double thread 2 engaging a nut 3 which is in the form of an elongated sleeve extending partly over the drive shaft 1 and the driven shaft 4. This sleeve is driven to rotate with shaft 1 through the threaded connection therewith and against the resistance of a heavy coil spring 5, encircling shaft 1 and bearing at its ends between the surface 6 on the spring housing 7 fast to shaft 1 and a bearing 8 on the end of the sleeve or nut 3. The sleeve 3 carries a plurality of rollers 9 which serve to connect it with any one of the three gears 10, 11 or 12, mounted for rotation upon the sleeve 3. The rollers 9 are shown in normal driving relationship with gear 10 and this gear is rigidly connected by screws 13 with a cylindrical member 14 fast to the driven shaft 4. The member 14 serves as a bearing for retaining the shaft 4, sleeve 3 and consequently shaft 1 in alinement. In this normal relationship of the parts and with a light load, there is a direct drive connection between the shafts 1 and 4 and if the load increases materially so as to overcome the normal resistance of spring 5 this spring is further tensioned due to the sleeve 3 traveling to the right along the shaft 1. This travel of the sleeve along the shaft 1 is brought about by the load overcoming the resistance of the spring, the shaft 1 screwing the sleeve 3 to the right because of the threaded connection between the two. The rollers 9 carried by the sleeve are moved out of coacting relationship with gear 10 into coaction with the gear 11 and during this movement are pressed inwardly against the spring seats 15 while passing the shoulders 16, on gears 10 and 11, between the recesses 17 in the gear 10 and the recesses 18 in the gear 11, which then receive the rollers 9.

The gears 10, 11 and 12 respectively mesh with gears 19 to 20 and 21 forming a unitary nest of gears on a countershaft 22. These gears may either rotate as a unit on the countershaft 22 or are fixed thereto, as shown. When the rollers 9 engage the gear 11, power is transmitted from sleeve 3 to the gears 11, 20, 19, and 10 to the shaft 4 driving the latter at a reduction in speed with respect to the speed of shaft 1. A further increase in the load will result in a further movement of sleeve 3 to the right of Fig. 1, causing this sleeve to be unclutched from gear 11 and clutched to gear 12. The driving connection between shafts 1 and 4 is then from the sleeve 3 through the gears 12, 21, 19 and 10.

To cushion the action of roller 9 it is preferred to support these rollers between a pair of opposed members 23 slidably mounted within the recesses in the sleeve 3 against the action of cushioning springs 24. In the clutch shifting movement of sleeve 3, the springs 24 are first compressed, and the actual shifting of the clutch from one gear to another does not take place until the load or torque on shaft 4 reaches a predetermined value with respect to the driving movement on shaft 1.

The operation of the device has been described in connection with the foregoing description of the mechanism, but to repeat briefly, is as follows:

Assuming that there is some light normal load on shaft 4, this shaft will rotate at the same speed as drive shaft 1, the direction of rotation of which is indicated by the arrow 25. The pressure of spring 5 holds sleeve 3 in the normal position indicated in the drawing. The sleeve is rotated with shaft 1 because of the lateral pressure of the external teeth on the shaft with the internal teeth on the sleeve. The sleeve is directly connected through the clutch rollers 9 with gear 10 fast to the cylindrical member 14, which is shown keyed to shaft 4. When the load on shaft 4, and consequently the torque on sleeve 3, is sufficient to overcome the normal resistance of spring 5, relative rotation takes place between the sleeve 3 and shaft 1, sufficient to cause the sleeve to travel to the right along the shaft and further compress spring 5. Springs 24 on one side of the clutches 9 are compressed and assist in causing the clutches to move rapidly from one gear to another.

I claim:

1. In a device of the character described, driving and driven shafts, variable ratio gearing between the driving and driven shafts, a torque-governed sleeve on the driving shaft movable relatively longitudinally therewith, yielding means for resisting said relative longitudinal movement, a slot in said sleeve, and a clutch in said slot yieldingly longitudinally movable independent of said relative longitudinal movement but operable by said relative longitudinal movement for automatically determining said ratio.

2. In a device of the character described, driving and driven shafts, variable ratio gearing between the driving and driven shafts, a torque-governed sleeve on the driving shaft having internal screw threads, screw threads on the driving shaft meshing with said internal screw threads whereby said sleeve and shaft may move relatively longitudinally, yielding means for resisting said relative longitudinal movement, a slot in said sleeve, and a clutch in said slot yieldingly longitudinally movable independent of said relative longitudinal movement but operable by said relative longitudinal movement for automatically determining said ratio.

3. In a device of the character described, driving and driven shafts, variable ratio gearing between the driving and driven shafts, a torque-governed sleeve on one of said shafts movable relatively longitudinally therewith, yielding means for resisting said relative longitudinal movement, a slot in said sleeve, and a clutch in said slot yieldingly longitudinally movable independent of said relative longitudinal movement but operable by said relative longitudinal movement for automatically determining said ratio.

4. In a device of the character described, driving and driven shafts, variable ratio gearing between the driving and driven shafts, a torque-governed sleeve on one of said shafts having internal screw threads, screw threads on said shaft meshing with said internal screw threads whereby said sleeve and shaft may move relatively longitudinally, yielding means for resisting said relative longitudinal movement, a slot in said sleeve, and a clutch in said slot yieldingly longitudinally movable independent of said relative longitudinal movement but operable by said relative longitudinal movement for automatically determining said ratio.

Signed at Chicago this 18th day of January, 1927.

FRED W. MAYER.